United States Patent [19]

Wang

[11] Patent Number: 5,662,441
[45] Date of Patent: Sep. 2, 1997

[54] SMALL SCALE MILLING MACHINE

[76] Inventor: Ching Chih Wang, P.O. Box 82-144, Taipei, Taiwan

[21] Appl. No.: 465,009

[22] Filed: Jun. 5, 1995

[51] Int. Cl.⁶ ...................................... B23C 1/12
[52] U.S. Cl. ................... 409/185; 408/111; 408/135; 409/210; 409/211; 409/214
[58] Field of Search .................... 409/159, 164, 409/167, 185, 184, 201, 210, 211, 214, 218, 235; 408/110, 111, 135, 236

[56] References Cited

U.S. PATENT DOCUMENTS

| | | | |
|---|---|---|---|
| 1,397,696 | 11/1921 | Nelson | 408/135 |
| 3,412,813 | 11/1968 | Johnson | 408/135 |
| 4,082,474 | 4/1978 | Stiger | 408/110 |
| 4,187,601 | 2/1980 | Aldrin | 409/201 |
| 4,391,558 | 7/1983 | Perry | 409/216 |

Primary Examiner—Daniel W. Howell
Attorney, Agent, or Firm—Alfred Lei

[57] ABSTRACT

A small scale milling machine including a machine base having an upright rotary wheel, a rotary column sleeve fixedly secured to the rotary wheel, a retractable support fixedly secured to the inside of the rotary column sleeve to hold a vertical mounting frame outside the rotary column sleeve, a machine head suspended from the bottom end of the vertical mounting frame and connected to the rotary column sleeve by a dovetail joint and moved vertically along a longitudinal rack on the rotary column sleeve, the rotary column sleeve having a longitudinal track at one lateral side, two stop blocks adjustably fixed to the longitudinal track at different elevations to limit the vertical moving distance of the machine head, and a scale at the front side along the longitudinal track for measuring the vertical moving distance of the machine head.

2 Claims, 4 Drawing Sheets

SMALL SCALE MILLING MACHINE

BACKGROUND OF THE INVENTION

The present invention relates to a small scale milling machine which uses a retractable support to hold a vertical mounting frame for suspending the machine head, and which uses two stop blocks mounted on a longitudinal track on the rotary column sleeve at different elevations to limit the vertical moving distance of the machine head.

Various small scale milling machines have been developed for processing a variety of workpieces, and have appeared on the market. These small scale milling machines are very suitable for personal use to meet different processing jobs and do-it-yourself works. FIGS. 3 and 4 show a small scale milling machine according to the prior art, which comprises a rotary column sleeve 11 made from a metal plate by a punching machine, and two parallel rails 12 welded to the front side of the rotary column sleeve 11 for guiding the vertical movement of the machine head 13. This structure of small scale milling machine is still not satisfactory in function. When the machine head 13 is reciprocated on the rails 12, it tends to vibrate. Therefore, this structure of small scale milling machine is not suitable for high-precision processing works. Furthermore, this structure of small scale milling machine has no means to measure and set the vertical moving distance of the machine head.

SUMMARY OF THE INVENTION

The present invention has been accomplished to provide a small scale milling machine which eliminates the aforesaid drawbacks. According to one aspect of the present invention, the rotary column sleeve of the small scale milling machine has a longitudinal track at one lateral side and two stop blocks adjustably fixed to the longitudinal track at different elevations to limit the vertical moving distance of the machine head. According to another aspect of the present invention, the rotary column sleeve has a scale at the front side along the longitudinal track for measuring the vertical moving distance of the machine head. According to still another aspect of the present invention, a retractable support is fixedly secured to the inside of the rotary column sleeve to hold a vertical mounting frame outside the rotary column sleeve for permitting the machine head to be suspended from the transverse bottom plate at the bottom end of the vertical mounting frame.

Other objects of the invention will in part be obvious and in part hereinafter pointed out.

The invention accordingly consists of features of constructions and method, combination of elements, arrangement of parts and steps of the method which will be exemplified in the constructions and method hereinafter disclosed, the scope of the application of which will be indicated in the claims following.

DETAILED DESCRIPTION OF THE PREFERRED EMBODIMENT

Figure 1:
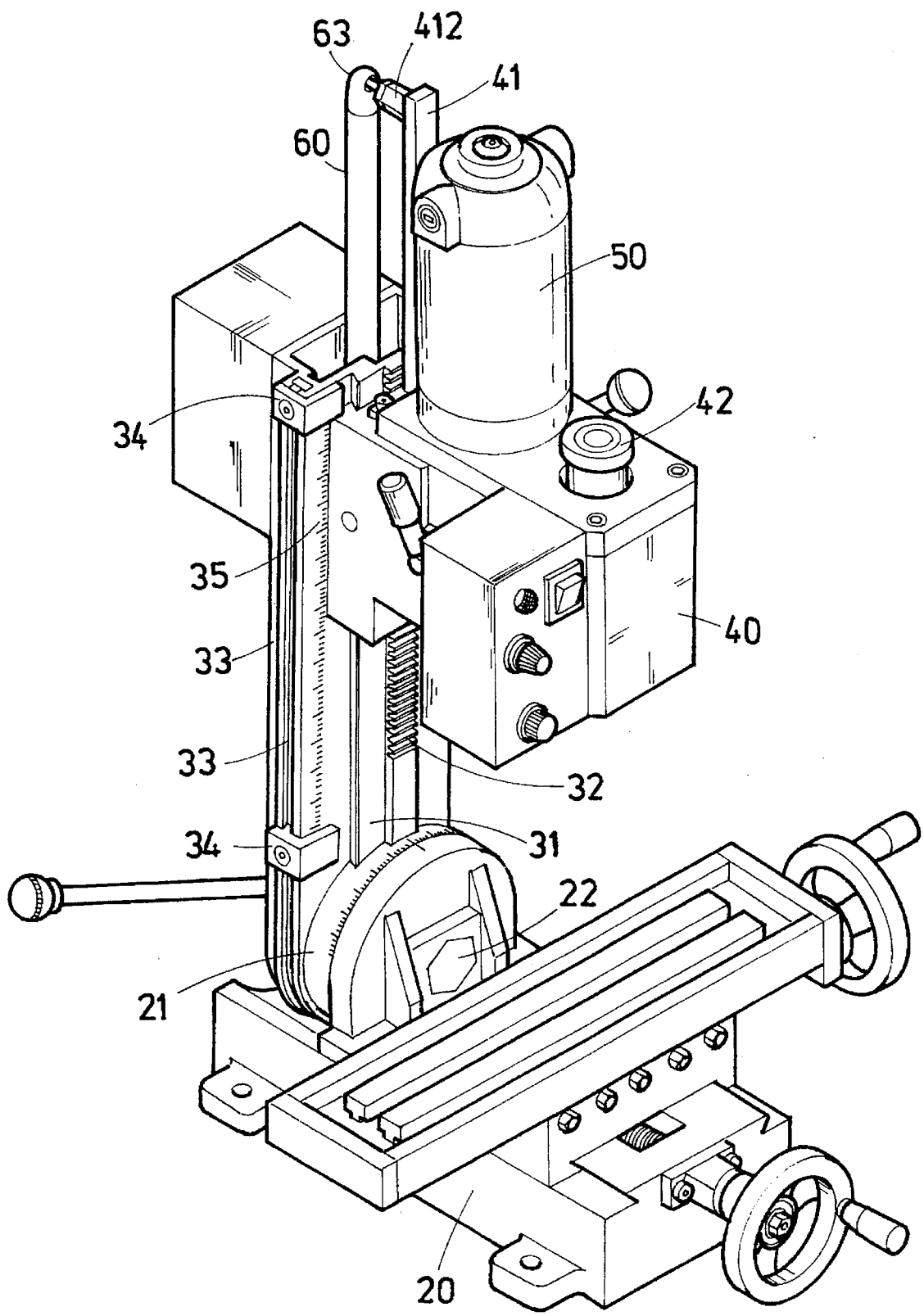
FIG. 1 is an elevational view of a small scale milling machine according to the present invention.

For purpose to promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

Figure 2:
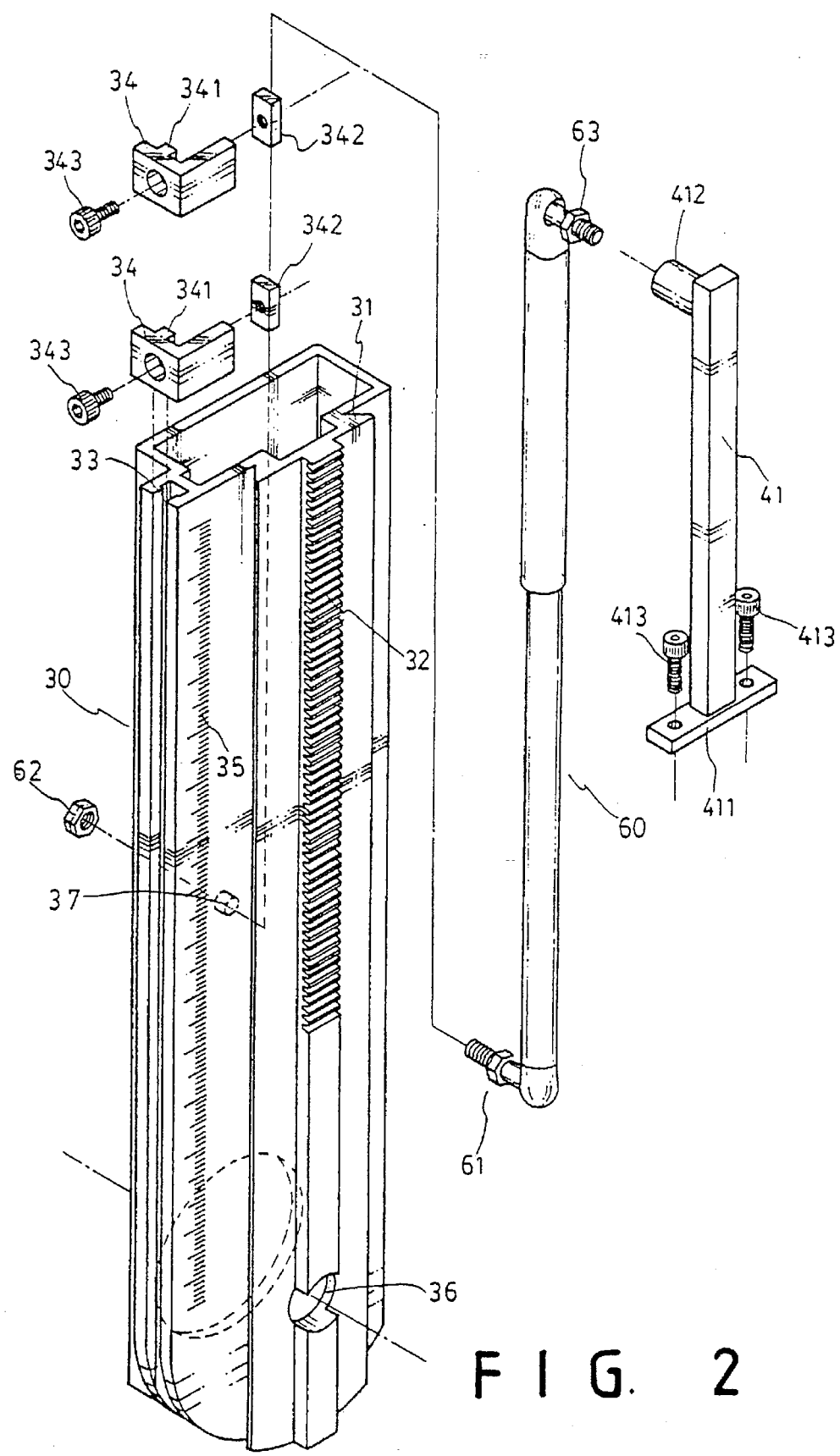
FIG. 2 is an exploded view of the rotary column sleeve, the telescopic support, and the vertical mounting frame according to the present invention.
Figure 3:
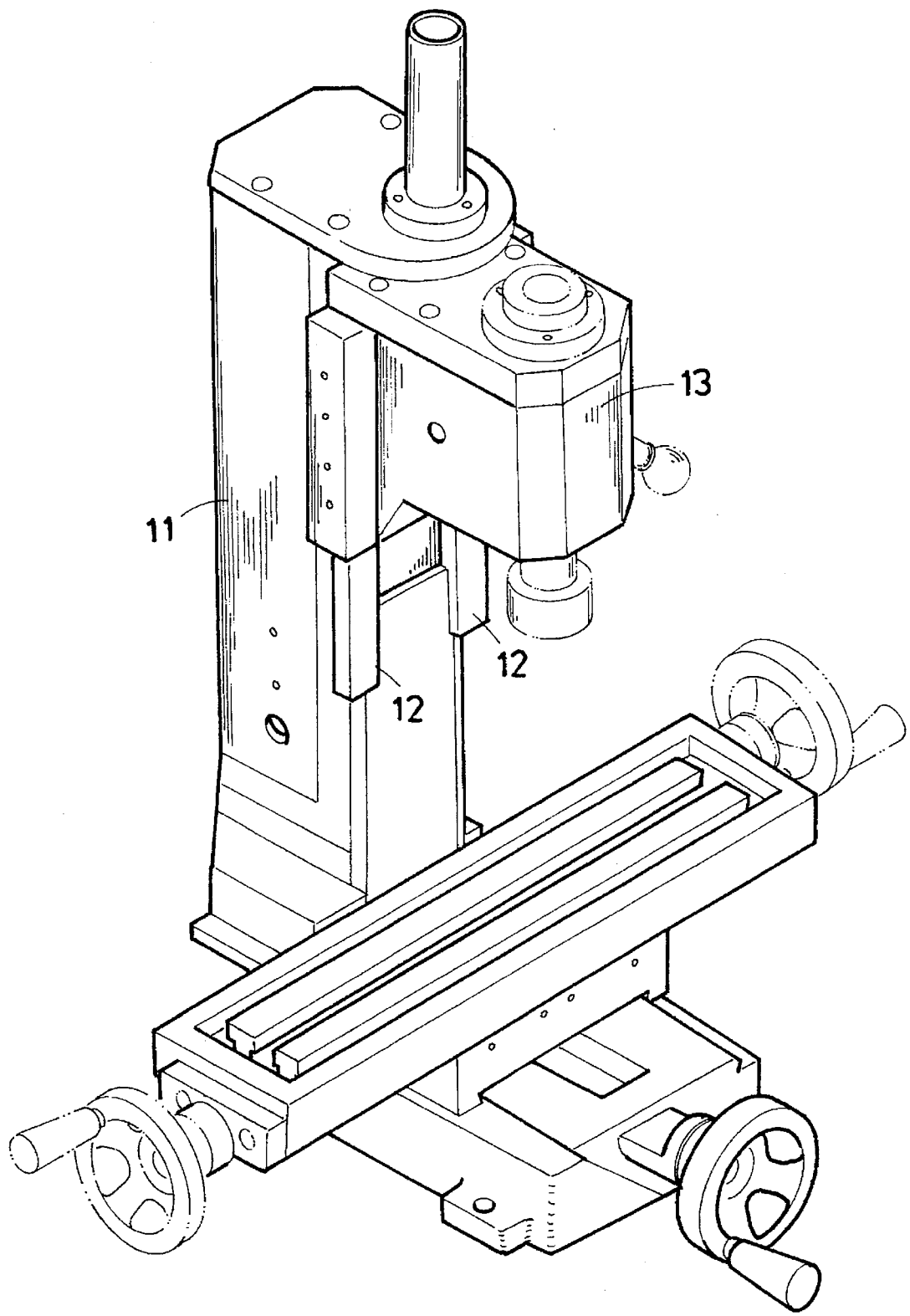
FIG. 3 is an elevational view of a small scale milling machine according to the prior art.
Figure 4:
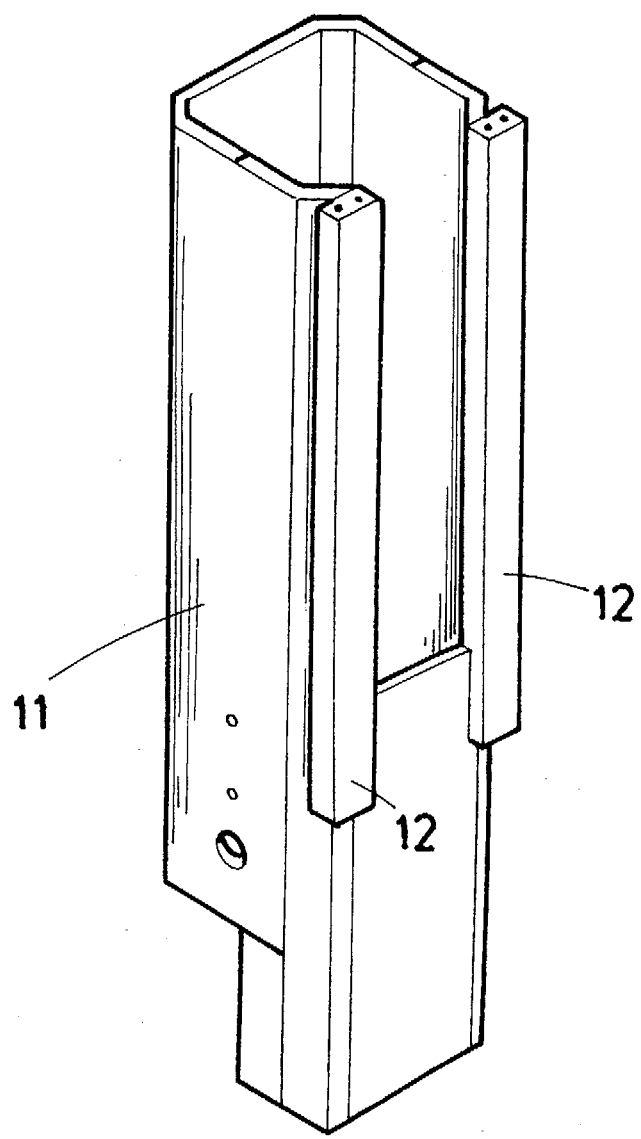
FIG. 4 shows the structure of the rotary column sleeve and the rails on the column according to the prior art.

Referring to FIGS. 1 and 2, a small scale milling machine in accordance with the present invention is Generally comprised of a machine base 20, a rotary column sleeve 30 mounted on the machine base 20, a machine head 40 suspended on the rotary column sleeve 30 by a retractable support 60 and a vertical mounting frame 41 and moved along a vertical rack 32 on the rotary column sleeve 30, and a driving motor 50 mounted on the machine head 40 for turning the cutting metal-working tool (not shown).

Referring to FIG. 2 again, the rotary column sleeve 30 comprises a longitudinal dovetail tongue 31 at the front side, a unitary longitudinal rack 32 raised from the longitudinal dovetail tongue 31, a longitudinal track 33 at one lateral side for mounting two stop blocks 34, a scale 35 on the front side along the longitudinal track 33 for measuring the distance between the stop blocks 34, a transverse through hole 36 through the front side and the back side near the circularly curved bottom end for coupling to the upright rotary wheel 21 on the machine base 20 by a screw bolt 22. The stop blocks 34 have a respective coupling portion 341 slidably coupled to the longitudinal track 33 on the rotary column sleeve 30, and then fixed in position by a respective screw 343 and a respective square nut 342. By adjusting the distance between the stop blocks 34, the moving distance of the machine head 40 in the Z-axis direction is controlled. The retractable support 60 has a bottom end 61 inserted into the rotary column sleeve 30 from the top and then fixed to a back hole 37 on the back side of the rotary column sleeve 30 by a nut 62, and a top end 63 disposed outside the rotary column sleeve 30 and fastened to the top end 412 of the vertical mounting frame 41. The vertical mounting frame 41 has a transverse bottom plate 411 fixedly secured to the top side of the machine head 40 by screws 413. The machine head 40 has a longitudinal dovetail groove (not shown) on the back side engaged with the longitudinal dovetail tongue 31 on the rotary column sleeve 30. Because the machine head 40 is suspended from the vertical mounting frame 41 and engaged with the longitudinal dovetail tongue 31 on the rotary column sleeve 30, it can be smoothly moved along the longitudinal rack 32 on the rotary column sleeve 30. Furthermore, by changing the elevations of the stop blocks 34 on the longitudinal track 33, the vertical moving distance of the machine head 40 is adjusted.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A small scale milling machine of the type comprising a machine base having an upright rotary wheel, a rotary column sleeve fixedly secured to said rotary wheel, a machine head mounted on said rotary column sleeve and moved vertically along a longitudinal track on said rotary column sleeve, and a driving motor mounted on said machine head and controlled to turn a cutting metal-working tool against the workpiece, wherein: said rotary column sleeve comprises a longitudinal dovetail tongue at a front side thereof engaged with a longitudinal dovetail groove on said machine head, a unitary longitudinal rack raised from said longitudinal dovetail tongue and engaged with the inside of the longitudinal dovetail groove of said machine head, a longitudinal track at one lateral side of said rotary column sleeve, two stop blocks fixed to said longitudinal track at different elevations to limit the vertical moving distance of said machine head, a scale on the front side along said longitudinal track for measuring the distance between said stop blocks, a transverse through hole near a circularly curved bottom end of said rotary column sleeve and fixed to said upright rotary wheel of said machine base by a screw bolt; and said machine head is suspended from a vertical mounting frame being fixedly secured to a retractable support on said rotary column sleeve, said retractable support having a fixed bottom end inserted into said rotary column sleeve and fixedly secured to the inside of said rotary column sleeve and a movable top end fixedly connected to said vertical mounting frame, said vertical mounting frame having a top end fixedly secured to the movable top end of said retractable support and a bottom end terminating in a transverse bottom plate fixedly secured to the topmost side of said machine head by screws.

2. The small scale milling machine of claim 1 wherein said stop blocks are moved along said longitudinal track and then fixed in position by a respective screw and a respective nut.

* * * * *